(12) United States Patent
Wada et al.

(10) Patent No.: US 6,410,626 B1
(45) Date of Patent: Jun. 25, 2002

(54) AQUEOUS DISPERSION COMPOSITION AND COATED ARTICLES

(75) Inventors: Susumu Wada; Katsuhiko Imoto; Kayoko Honda, all of Settu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/423,070

(22) PCT Filed: Apr. 30, 1998

(86) PCT No.: PCT/JP98/01968

§ 371 (c)(1),
(2), (4) Date: Jan. 4, 2000

(87) PCT Pub. No.: WO98/49230

PCT Pub. Date: Nov. 5, 1998

(30) Foreign Application Priority Data

Apr. 30, 1997 (JP) ............................................. 9-127968
Jun. 4, 1997 (JP) ............................................. 9-163370

(51) Int. Cl.$^7$ ................................................. C08K 5/24
(52) U.S. Cl. ....................................... 524/266; 524/506
(58) Field of Search .................................. 524/266, 506

(56) References Cited

U.S. PATENT DOCUMENTS 4,373,043 A * 2/1983 Yagi ........................... 524/130
5,889,086 A * 3/1999 Ushijima ..................... 523/169

OTHER PUBLICATIONS

Patent Abstracts of Japan, vol. 1998, No. 9, Jul. 31, 1998 and JP 10 110078A, Apr. 28, 1998, abstract.

* cited by examiner

*Primary Examiner*—Paul R. Michl
(74) *Attorney, Agent, or Firm*—Connolly Bove Lodge & Hutz LLP

(57) ABSTRACT

An aqueous dispersion composition to be applied to porous construction and building materials, which is of the aqueous one-component type, hence simple and easy to apply, and at the same time has both decorative and sufficient waterproofing properties is provided, as well as a coated article obtained by using the same. The aqueous dispersion composition of the present invention is characterized by containing (1) a repellent, (2) an organosilicon compound of the general formula (I)

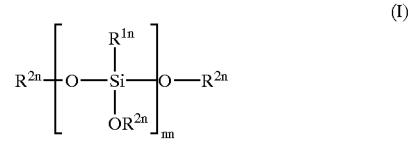

wherein $R^{1n}$ represents a saturated alkyl group containing 1 to 18 carbon atoms and, when nn is 2 or more, the $R^{1n}$ groups may be the same or different; $R^{2n}$ represents a saturated alkyl group containing 1 to 5 carbon atoms and, when nn is 2 or more, the $R^{2n}$ groups may be the same or different; and nn represents an integer of 1 to 9, and (3) a fluorine-containing resin.

21 Claims, No Drawings

AQUEOUS DISPERSION COMPOSITION AND COATED ARTICLES

TECHNICAL FIELD

The present invention relates to an aqueous dispersion composition which, when applied to the surface of a porous civil engineering or building material, maintains its waterproofing and decorative effects for a long period of time and also has an excellent antifungal activity, and to an article coated therewith.

BACKGROUND ART

Porous civil engineering and building materials are widely used in various fields, inclusive of construction and building materials. As such porous civil engineering and building materials, there maybe mentioned, among others, porous inorganic construction and building materials such as architectural concrete, lightweight concrete, precast concrete, autoclaved lightweight concrete (ALC), asbestos slates, mortar, calcium silicate boards, pulp cement boards, cemented excelsior boards, gypsum boards, hard boards, plaster, bricks, blocks, tiles, gypsum plaster, dolomite plaster, natural stones, artificial stones, and glass wool; and porous organic construction and building materials such as lumbers or timbers, plywoods, and particle boards.

Unless subjected to strict waterproofing treatment, these porous construction and building materials may allow moisture to penetrate into the inside thereof until a long time has passed, whereby cracking may be caused due to expansion, for instance, and when structural steels exist therein, the moisture may induce rusting of the structural steels and cause cracking due to expansion. Furthermore, if the waterproofing treatment is insufficient, the surface may assume the so-called wet color, whereby the decorative feature is impaired.

Organosilicon compounds and the like have so far been used as waterproofing agents preventing absorption of water to porous construction and building materials by coating or absorbing the surface thereof. However, they have a drawback in that they cannot fully express their waterproofing property when they are used under conditions where water will stay on the material surface for long.

In Japanese Kokai Publication Hei-03-232527, there is disclosed a technology which comprises making up an alkylalkoxysilane into an aqueous composition without using any solvent and using the same as a penetrable water-absorption inhibitor for concrete. According to this technology, alkylalkoxysilanes known to have waterproofing effects are made up into aqueous compositions using specific emulsifiers to thereby control environmental pollution by organic solvents and acquire penetrating properties and good waterproofing effects. However, the effects are not maintained long.

Studies have been done in respect of decorative qualities of porous construction and building materials as well. Japanese Kokai Publication Hei-05-124880 discloses a method of finishing such materials by applying thereto an undercoat composition mainly comprising an aqueous silicone compound and a top coat composition comprising a pigment-containing or pigment-free fluororesin paint in that order. According to this technology, a decorative feature, for example an architectural concrete-like feature, can be provided in addition to the prolonged waterproofing effect mentioned above.

This technology, however, requires two substrate coating procedures, hence much time and labor are required in field operations and, furthermore, problems still remain from the viewpoint of reproducibility and quality maintenance.

SUMMARY OF INVENTION

In view of the above state of the art, it is an object of the present invention to provide an aqueous dispersion composition for the application to porous construction and building materials, which is of the aqueous one-component type, hence simple and easy to apply, and at the same time has both decorative and sufficient waterproofing properties, as well as a coated article obtained by using the same.

The aqueous dispersion composition of the present invention comprises (1) a repellent, (2) an organosilicon compound of the general formula (I)

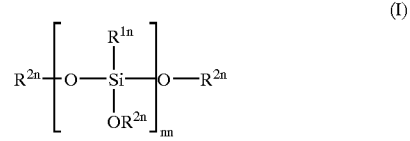

(wherein $R^{1n}$ represents a saturated alkyl group containing 1 to 18 carbon atoms and, when nn is 2 or more, the $R^{1n}$ groups may be the same or different; $R^{2n}$ represents a saturated alkyl group containing 1 to 5 carbon atoms and, when nn is 2 or more, the $R^{2n}$ groups may be the same or different; and nn represents an integer of 1 to 9), and (3) a fluorine-containing resin.

DETAILED DESCRIPTION OF THE INVENTION

In the following, the present invention is described in detail.

The aqueous dispersion composition of the present invention comprises (1) a repellent, (2) an organosilicon compound and (3) a fluorine-containing resin.

First, the repellent (1) is described.

The repellent (1) to be used according to the present invention comprises at least one member selected from among perfluoroalkyl group-containing compounds, fluorinated surfactants, fluorinated oils, fluorosilicone oils and silicone oils. Among them, perfluoroalkyl-containing compounds are preferred. These repellents are described below.

(I) Perfluoroalkyl-containing Compounds

Mention may be made of homopolymers of a perfluoroalkyl-containing, ethylenically unsaturated monomer, and copolymers of such monomer and some other monomer.

As said perfluoroalkyl-containing ethylenically unsaturated monomer, there may be mentioned, for example, the following compounds:

$$Rf(CH_2)_n OCOCR^3 = CH_2$$

-continued

RfCH$_2$CH(OH)CH$_2$OCOCR$^3$=CH$_2$
RfCH$_2$CH(OCOR$^4$)CH$_2$OCOCR$^3$=CH$_2$

Rf(CH$^2$)$_m$COOCH=CH$_2$
RF(CH=CH(CH$_2$)$_n$OCOCR$^3$=CH$_2$

In the above formulas, Rf represents a perfluoroalkyl group the alkyl moiety of which contains 4 to 20 carbon atoms; R$^1$ represents hydrogen or an alkyl group containing 1 to 10 carbon atoms; R$^2$ represents an alkylene group containing 1 to 10 carbon atoms; R$^3$ represents a hydrogen atom or a methyl group; R$^4$ represents an alkyl group containing 1 to 17 carbon atoms; n represents an integer of 1 to 10; and m represents an integer of 0 to 10.

As said other monomer, which is copolymerizable with the above-mentioned perfluoroalkyl-containing, ethylenically unsaturated monomer, there may be mentioned, among others, alkyl (meth) acrylates in which the alkyl moiety contains 1 to 20 carbon atoms, cyclohexyl (meth)acrylate, benzyl (meth)acrylate, polyethylene glycol di(meth) acrylate, N-methylolacrylamide, ethylene, vinyl chloride, vinyl fluoride, (meth)acrylamide, styrene, α-methylstyrene, p-methylstyrene, vinyl alkyl ethers in which the alkyl moiety contains 1 to 20 carbon atoms, haloalkyl vinyl ethers in which the alkyl moiety contains 1 to 20 carbon atoms, vinyl alkyl ketones in which the alkyl moiety contains 1 to 20 carbon atoms, maleic anhydride, butadiene, isoprene, chloroprene; and silyl-containing vinyl monomers, such as vinyltriethoxysilane, vinyltrimethoxysilane and γ-(methacryloxypropyl) trimethoxysilane.

Solutions or dispersions of such a copolymer in an organic solvent or an aqueous medium are commercially available. As such, there may be mentioned, for example, Unidyne TG-652 (product of Daikin Industries), Unidyne TG-664 (product of Daikin Industries), Unidyne TG-410 (product of Daikin Industries) and the like.

In addition to the perfluoroalkyl-containing polymer (I) mentioned above, other perfluoroalkyl-containing compounds may also be used as the repellent in the present invention. As said other perfluoroalkyl-containing compounds, there may be mentioned reaction products from a compound represented by the following general formula RfNR$^2$—OH
Rf(CH$_2$)$_n$—OH RfCONR$^2$—OH RfCH$_2$CR$^2$(OH)—OH
         |
         R$^1$ RfCH$_2$CHR$^2$(OCOR$^4$)—OH RfSO$_2$N(CH$_2$)$_n$—OH
    |
    R$^1$ RfCON(CH$_2$)$_n$—OH
    |
    R$^1$ RfNR$^2$—SH
Rf(CH$_2$)$_n$—SH RfCONR$^2$—SH RfCH$_2$CR$^2$(SH)—SH
         |
         R$^1$ RfCH$_2$CHR$^2$(OCOR$^4$)—SH RfSO$_2$N(CH$_2$)$_n$—SH
    |
    R$^1$ RfCON(CH$_2$)$_n$—SH
    |
    R$^1$ RfNR$^2$—NH$_2$
Rf(CH$_2$)$_n$—NH$_2$ RfCONR$^2$—NH$_2$ RfCH$_2$CR$^2$(NH$_2$)—NH$_2$
         |
         R$^1$ RfCH$_2$CHR$^2$(OCOR$^4$)—NH$_2$ RfSO$_2$N(CH$_2$)$_n$—NH$_2$
    |
    R$^1$ RfCON(CH$_2$)$_n$—NH$_2$
    |
    R$^1$ (wherein Rf, R$^1$, R$^2$, R$^4$ and n are as defined above), and an isocyanate compound. Said isocyanate compound includes aliphatic, alicyclic or aromatic monoisocyanato group-containing compounds; polyisocyanate compounds such as hexamethylene diisocyanate, trimethylhexamethylene diisocyanate, hexamethylene triisocyanate, lysine ester triisocyanates, isophoronediisocyanate, hydrogenated xylylene diisocyanate, toluenediisocyanate, xylylene diisocyanate, diphenylmethanediisocyanate, etc.; modifications of these, such as trisbiuret modifications, isocyanurate modifications and triol modifications, and so forth.

As the perfluoroalkyl-containing compounds usable as the repellent in the present invention, there may further be mentioned esterification reaction products from a compound represented by the following general formula RfNR$^2$—OH
Rf(CH$_2$)$_n$—OH RfCONR$^2$—OH -continued

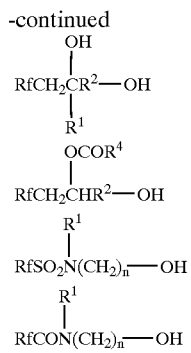

(wherein Rf, $R^1$, $R^2$, $R^4$ and n are as defined above), and a compound having a carboxylic acid or phosphoric acid group as a functional group.

As a commercial product, there may be mentioned TG101 (product of Daikin Industries), for instance.

(II) Fluorinated Surfactants

The fluorinated surfactants usable in the present invention are perfluoroalkyl group-containing surfactants or a perfluoroalkylene group-containing surfactants, and include anionic fluorinated surfactants, cationic fluorinated surfactants, amphoteric fluorinated surfactants and nonionic fluorinated surfactants. More specifically, there may be mentioned Unidyne DS-101 (product of Daikin Industries), Unidyne DS-202 (product of Daikin Industries), Unidyne DS-301 (product of Daikin Industries), Unidyne DS-406 (product of Daikin Industries) and so on.

(III) Fluorinated Oils

As the fluorinated oils usable in the present invention, there may be mentioned perfluoropolyethers, chlorotrifluoroethylene polymers, and other specific fluorinated hydrocarbon compounds, among others. More specifically, there may be mentioned Demnum S-20 (product of Daikin Industries), Daifloil #20 (product of Daikin Industries), etc.

(IV) Fluorosilicone Oils

The fluorosilicone oils usable in the present invention contain a fluoroalkyl group in the side chains or at the terminus or termini of the polysiloxane main chain. More specifically, there may be mentioned FS-1265 (product of Toray Dow Corning Silicone), X-22-819 (product of Shin-Etsu Chemical Co.), FL 100 (product of Shin-Etsu Chemical Co.) and the like.

(V) Silicone Oils

As the silicone oils usable in the present invention, there may be mentioned silicone oils having a viscosity at 25° C. of not less than 50 cps, or silicone oils having a side chain or terminal reactive group or groups. More specifically, there may be mentioned dimethylsilicone oils, methyl chlorinated silicone oils, methylphenylsilicone oils, organic group-modified silicone oils, etc. For example, compounds represented by the following formulas, among others, may be mentioned:

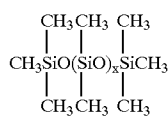

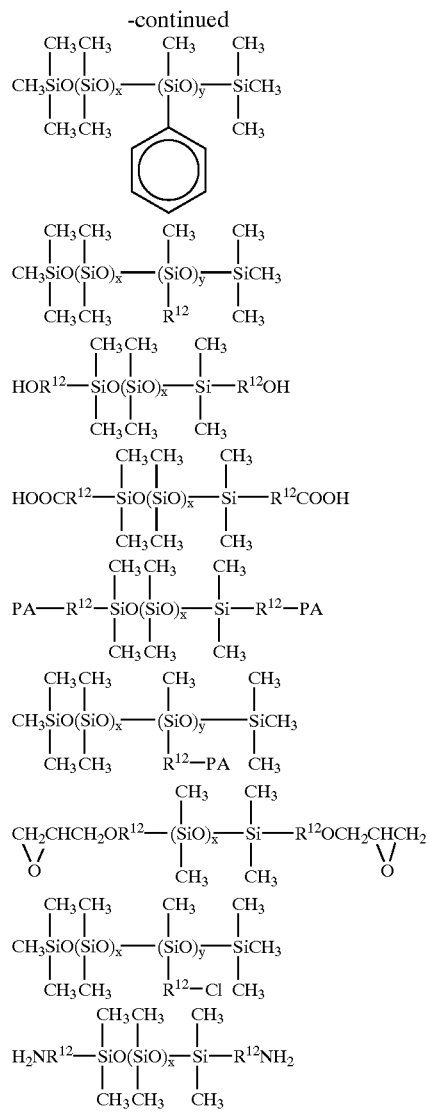

In the above formulas, $R^{12}$ represents an alkylene group containing 1 or more carbon atoms, PA represents a polyalkylene oxide, and x and y each represents an integer of 1 or more.

More specifically, there may be mentioned, for instance, PRX 413 (product of Toray Dow Corning Silicone), SF 8417 (ditto), SF 8418 (ditto), BY 16-855B (ditto), SF 8427 (ditto), SF 8428 (ditto), X-22-161C (product of Shin-Etsu Chemical Co.), KF-857 (ditto), KP-358 (ditto), KP-359 (ditto) and the like.

Since the repellent (1) has now been fully described, the organosilicon compound (2) will now be described.

Said organosilicon compound (2) is represented by the above general formula (I).

The saturated alkyl group containing 1 to 18 carbon atoms as represented by $R^{1n}$ is not particularly restricted but includes, among others, methyl, ethyl, propyl, butyl, pentyl, hexyl, heptyl, octyl, nonyl, decyl, undecyl, dodecyl, tridecyl, tetradecyl, pentadecyl, hexadecyl, heptadecyl and octadecyl. These may be straight-chained or branched.

The saturated alkyl group containing 1 to 5 carbon atoms as represented by $R^{2n}$ is not particularly restricted but includes, among others, methyl, ethyl, propyl, butyl and pentyl. These may be straight-chained or branched.

The symbol nn represents an integer of 1 to 20.

As said organosilicon compound (1), there may more specifically be mentioned, among others, methyltrimethoxysilane, ethyltrimethoxysilane, propyltrimethoxysilane, butyltrimethoxysilane, pentyltrimethoxysilane, hexyltrimethoxysilane, heptyltrimethoxysilane, octyltrimethoxysilane, nonyltrimethoxysilane, decyltrimethoxysilane, undecyltrimethoxysilane, dodecyltrimethoxysilane, tridecyltrimethoxysilane, tetradecyltrimethoxysilane, pentadecyltrimethoxysilane, hexadecyltrimethoxysilane, heptadecyltrimethoxysilane, octadecyltrimethoxysilane, methyltriethoxysilane, ethyltriethoxysilane, propyltriethoxysilane, butyltriethoxysilane, pentyltriethoxysilane, hexyltriethoxysilane, heptyltriethoxysilane, octyltriethoxysilane, nonyltriethoxysilane, decyltriethoxysilane, undecyltriethoxysilane, dodecyltriethoxysilane, tridecyltriethoxysilane, tetradecyltriethoxysilane, pentadecyltriethoxysilane, hexadecyltriethoxysilane, heptadecyltriethoxysilane, octadecyltriethoxysilane and so forth. Among them, methyltrimethoxysilane and methyltriethoxysilane are preferred.

The above-mentioned organosilicon compounds may be used also in their dimer form as the organosilicon compound (2) in the present invention. As such, there may be mentioned those of general formula (I) in which nn is 2, for instance. Furthermore, those in which nn is up to 20 may be used as well.

In preparing the aqueous dispersion composition of the present invention, the organosilicon compound (2) mentioned above is used in an emulsified form. Such emulsification can be realized in the conventional manner, for example by using an emulsifier. Said emulsifier is not particularly restricted but may be a nonionic emulsifier, an anionic emulsifier, or the like.

Said nonionic emulsifier is not particularly restricted but includes, among others, common nonionic emulsifiers such as glycerol monostearate, glycerol monooleate, sorbitan monolaurate, sorbitan monopalmitate, sorbitan monostearate, sorbitan monooleate, sorbitan monotrioleate, sorbitan monosesquioleate, polyoxyethylenesorbitan monolaurate, polyoxyethylenesorbitan monopalmitate, polyoxyethylenesorbitan monostearate, polyoxyethylenesorbitan monooleate, polyoxyethylenesorbitan monotrioleate, polyoxyethylenesorbitan monosesquioleate, polyoxyethylenesorbitol tetraoleate, polyoxyethylene lauryl ether, polyoxyethylene cetyl ether, polyoxyethylene stearyl ether, polyoxyethylene oleyl ether, polyoxyethylene higher alcohol ethers, polyoxyethylene octylphenyl ether, polyoxyethylene nonylphenyl ether, polyoxyethylene nonylphenyl ether and the like.

As further examples of the nonionic emulsifier, there may be mentioned fluorinated emulsifiers, silicone type emulsifiers and the like. As said fluorinated emulsifiers, there may be mentioned those mentioned hereinafter in detail under the heading "Fluorine-containing resin (3)", for instance. As said silicone type emulsifiers, there may be mentioned polyalkylene-modified polydimethylsiloxane compounds represented by either of the following two general formulas;

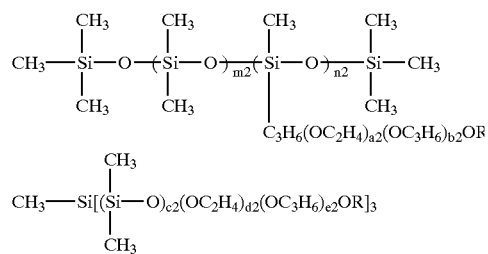

(In the above formulas, R represents a hydrogen atom or an alkyl group, and m2, n2, a2, b2, c2, d2 and e2 each represents an integer indicative of the number of repetitions).

The above-mentioned anionic emulsifier is not particularly restricted but includes, among others, sodium lauryl sulfate, ammonium lauryl sulfate, sodium dodecylbenzenesulfonate, sodium alkylnaphthalenesulfonates, dialkyl sulfosuccinate sodium salt, sodium alkyldiphenyl ether disulfonates, alkyl phosphate diethanolamine salts, alkyl phosphate potassium salts, sodium polyoxyethylene lauryl ether sulfate, polyoxyethylene alkyl ether sulfuric acid triethanolamine salts, sodium polyoxyethylene alkylphenyl ether sulfates, sodium alkanesulfonates, mixed fatty acid soda soaps, semihardened beef tallow fatty acid soda soaps, semihardened beef tallow fatty acid potash soaps, stearic acid potash soap, oleic acid potash soap, castor oil potash soap, sodium higher alcohol sulfates, sodium salts of β-naphthalenesulfonic acid-formalin condensates, special aromatic sulfonic acid-formalin condensates, special carboxylic acid type surfactants, special polycarboxylic acid type surfactants, special polycarboxylic acid type polymer surfactants and the like.

The proportion of the anionic emulsifier in the sum of emulsifiers is not particularly restricted but preferably is 0.01 to 20% by weight. The nonionic emulsifiers mentioned above and the anionic emulsifiers mentioned above may respectively be used either singly or in combination, or one or more of the nonionic emulsifiers and one or more of the anionic emulsifiers may be used in combination. It is preferable, however, to use any of the nonionic emulsifiers and any of the anionic emulsifiers in combination. As the nonionic emulsifiers, polyalkylene oxide-modified polydimethylsiloxanes and fluorinated alkyl-containing polyalkylene oxides are preferred.

The method of emulsifying the organosilicon compound (2) of the present invention using the above-mentioned emulsifier (s) is not restricted. Emulsification can be realized, for example, by stirring a mixture of the organosilicon compound (2) and the emulsifier(s) at a high speed using a homomixer or the like and adding water dropwise thereto gradually. If, after such stirring, a fully homogeneous state is found, then a stable emulsion-like aqueous dispersion can be obtained by the addition of water. When water is added gradually, the concentration and viscosity may be high stage or an insoluble matter may appear or a transparent solution may be formed at an initial in some instances. In such cases, a uniform aqueous dispersion can be obtained as the amount of water is gradually increased.

The organosilicon compound (2) has been fully described hereinabove. So, the fluorine-containing resin (3) is now described.

Said fluorine-containing resin (3) is in the form of an aqueous dispersion.

Said aqueous dispersion will be described in detail hereinafter.

Said fluorine-containing resin (3) comprises a fluororesin or a mixture of a fluororesin and other resin(s). Said other resin includes, among others, acrylic resins, acrylsilicone resins, epoxy resins, urethane resins, ester type resins and so forth. From the viewpoint of the stability or durability of the aqueous dispersion composition of the present invention, however, acrylic resins are preferred.

As is evident from the above description, the "fluorine-containing resin" as so referred to in this specification includes, within the meaning thereof, the "fluororesin" mentioned above as it is or a mixture of said "fluororesin" and "other resin(s)". Furthermore, in this specification, said "other resin" includes acrylic resins, acrylsilicone resins, epoxy resins, urethane resins, ester type resins and the like and, preferably, said term means acrylic resins alone.

Said acrylic resins as other resins will be described in detail hereinafter.

The fluororesin mentioned above roughly includes the following four classes:

Fluororesin (1) comprising a copolymer of a fluoroolefin and a vinyl monomer;
Fluororesin (2) comprising a fluoroolefin copolymer;
Fluororesin (3) comprising a fluoroolefin homopolymer;
Fluororesin (4) prepared by seed polymerization of said fluororesin (1), said fluororesin (2) or said fluororesin (3) and an acrylic resin and occurring as an aqueous dispersion.

As is evident from the above description, the term "fluororesin" as used in this specification means a copolymer of one or more fluoroolefins and one or more vinyl monomers, a copolymer of two or more fluoroolefins, or a homopolymer of a fluoroolefin. Furthermore, in this specification, the term "fluororesin" means a fluororesin (4) with an acrylic resin incorporated therein by seed polymerization as obtained by causing an acrylic monomer to form a composite resin in an aqueous medium in the presence of resin particles of said fluororesin (1), said fluororesin (2) or said fluororesin (3) and occurring in an "aqueous dispersion" to be described in detail hereinafter, in addition to the above-mentioned (1) to (3).

In the following, the acrylic resin as another resin constituting the fluororesin (3) according to the present invention is described.

Said acrylic resin is not particularly restricted provided that it is a polymer whose main chain is constituted of a hydrocarbon chain derived from an acrylic acid and/or methacrylic acid. Generally, it includes, among others, homopolymers of an acrylic monomer, and copolymers of an acrylic monomer and other monomer(s) having an ethylenically unsaturated double bond copolymerizable therewith.

Said acrylic monomer is not particularly restricted provided that it contains an acrylic acid and/or methacrylic acid (hereinafter also referred to as "(meth)acrylic acid") moiety. Thus, it may be acrylic acid, an alkyl acrylate, methacrylic acid or an alkyl methacrylate, for instance.

Said alkyl (meth)acrylate is not particularly restricted but includes, for instance, alkyl acrylates whose alkyl moiety contains 1 to 18 carbon atoms, and alkyl methacrylates whose alkyl moiety contains 1 to 18 carbon atoms.

As such alkyl acrylates whose alkyl moiety contains 1 to 18 carbon atoms, there may be mentioned methyl acrylate, ethyl acrylate, n-propyl acrylate, isopropyl acrylate, n-butyl acrylate, isobutyl acrylate, t-butyl acrylate, 2-ethylhexyl acrylate, cyclohexyl acrylate, n-hexyl acrylate, t-butylcyclohexyl acrylate, stearyl acrylate and lauryl acrylate, among others.

As said alkyl methacrylates whose alkyl moiety contains 1 to 18 carbon atoms, there may be mentioned methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, cyclohexyl methacrylate, n-hexyl methacrylate, t-butylcyclohexyl methacrylate, stearyl methacrylate and lauryl methacrylate, for instance.

The acrylic monomers mentioned above may be copolymerized with a polyfunctional monomer such as ethylene glycol dimethacrylate or propylene glycol dimethacrylate for the purpose of improving the solvent resistance and water resistance.

As the monomer having an ethylenically unsaturated bond copolymerizable with the acrylic ester and/or methacrylic ester mentioned above, there may be mentioned, among others, those mentioned below under (I) and (II). (I) Monomers having a reactive functional group, for example, ethylenically unsaturated carboxylic acids such as maleic acid, itaconic anhydride, succinic anhydride, crotonic acid, etc.; amide compounds such as acrylamide, methacrylamide, N-methylacrylamide, N-methylolacrylamide, N-butoxymethylacrylamide, N-methylolmethacrylamide, N-methylmethacrylamide, N-butoxymethylmethacrylamide, etc.; hydroxyl-containing monomers such as hydroxyethyl acrylate, hydroxyethyl methacrylate, hydroxypropyl acrylate, hydroxypropyl methacrylate, etc.; epoxy-containing monomers such as glycidyl acrylate, glycidyl methacrylate, etc.; silanol-containing monomers such as γ-trimethoxysilane methacrylate, γ-triethoxysilane methacrylate, etc.; aldehyde-containing monomers such as acrolein etc.; caprolactone-modified hydroxy acrylates, and caprolactone-modified hydroxy methacrylates. (II) Other vinyl compounds, for example, α-olefins such as ethylene, propylene, isobutylene, etc.; vinyl ethers such as ethyl vinyl ether (EVE), cyclohexyl vinyl ether (CHVE), hydroxybutyl vinyl ether (HBVE), butyl vinyl ether, isobutyl vinyl ether, methyl vinyl ether, polyoxyethylene vinyl ether, etc.; alkenyl compounds such as polyoxyethylene allyl ether, ethyl allyl ether, hydroxyethyl allyl ether, allyl alcohol, allyl ether, etc.; vinyl esters such as vinyl acetate, vinyl lactate, vinyl butyrate, vinyl pivalate, vinyl benzoate, VEOVA 9 and VEOVA 10 (products of Shell), etc.; ethylenically unsaturated carboxylic acids such as itaconic anhydride, succinic anhydride, crotonic acid, etc.; aromatic vinyl compounds such as styrene, α-methylstyrene, p-t-butylstyrene, etc.; acrylonitrile, and the like.

Use may also be made, as the monomer having an ethylenically unsaturated bond copolymerizable with the acrylic ester and/or methacrylic ester mentioned above, of compounds containing, within the molecule thereof, a hydrophilic site-containing, low-molecular-weight polymer or oligomer. The hydrophilic site means a site having a hydrophilic group or a site having a hydrophilic bond, or a site comprising a combination of these. Said hydrophilic group may be an ionic, nonionic or amphoteric one or a combination of these. Nonionic or anionic hydrophilic groups are preferred, however. Any known reactive emulsifier may also be used as said monomer.

As said monomer having an ethylenically unsaturated bond copolymerizable with the acrylic ester and/or methacrylic ester mentioned above or as the reactive emulsifier, there may be mentioned, for example, polyethylene glycol methacrylate, polypropylene glycol methacrylate, methoxypolyethylene glycol methacrylate, polyethylene glycol acrylate, polypropylene glycol acrylate, methoxypolyethylene glycol acrylate, polyethylene glycol allyl ether, methoxypolyethylene glycol allyl ether, polyethylene glycol-polypropylene glycol monomethacrylate, polyethylene glycol-polytetramethylene glycol monomethacrylate, polyoxyethylene alkylallylphenyl ether, polyoxyethylene alkylallylphenyl ether sulfuric acid salts, styrenesulfonic acid salts, allylalkylsulfonic acid salts, polyethylene glycol methacrylate sulfate salts, alkylallylsulfosuccinic acid salts, bis(polyoxyethylene-polycyclic phenyl ether) methacrylated sulfuric acid ester salts, polyoxyethylene alkylphenyl ether acrylates, methacryloyloxypolyoxyalkylene sulfate salts, methacryloyloxyalkylene sulfate salts, polyoxyethylene vinyl ether, polyoxyethylene vinyl esters, and so on.

The method of polymerization for preparing a homopolymer of the acrylic monomer mentioned above or a copolymer of said acrylic acid and other copolymerizable monomer(s) for the purpose of obtaining the acrylic resin of the present invention is not particularly restricted but can adequately be selected from among per se known methods, such as emulsion polymerization, suspension polymerization and bulk polymerization techniques. The molecular weight and other characteristics of the polymer after polymerization can judiciously be selected considering the field of application thereof.

In carrying out the polymerization, the polymerization vessel, mode of polymerization, polymerization initiator, polymerization inhibitor, other auxiliaries, surfactant and other additives in emulsion polymerization can suitably be selected from among those known in the art. In selecting these, any of the so-far known ones can be employed on condition that the acrylic resin obtained is an adequate one.

The amount of the acrylic resin to be admixed for constituting the fluorine-containing resin (3) of the present invention is preferably 0 to 90% by weight, more preferably 0 to 80% by weight. If the mixing amount is excessive, the weather resistance and acid rain resistance will become poor.

The method of admixing is not particularly restricted but a generally known method can be used.

The acrylic resin as another resin has now been fully described.

In the following, the "aqueous dispersion" in relation to the fluorine-containing resin (3) of the present invention is described.

Said aqueous dispersion has a basic structure in which fluororesin particles are dispersed in an aqueous medium. Said aqueous dispersion comprises (A-1) an aqueous dispersion of a fluororesin prepared by seed polymerization of an acrylic resin and (A-2) an aqueous dispersion of a fluororesin free of seed polymerization of an acrylic resin.

The aqueous fluororesin dispersion (A-1) is obtained by causing an acrylic monomer to form a fluorine-containing composite resin in the presence of fluororesin particles in an aqueous medium.

Said aqueous medium is not particularly restricted but includes, among others, water supplemented with an additive, solvent and/or the like, which is to be mentioned in detail hereinafter.

In the above-mentioned aqueous fluororesin dispersion (A-1) derived by seed polymerization of an acrylic resin, the fluororesin constituting the fluororesin particles is a fluororesin (2) which is a fluoroolefin copolymer. Said fluoroolefin copolymer is dispersed in the aqueous medium in the form of particles and, in the formation of a fluorine-containing composite resin by the acrylic monomer mentioned above, the polymerization is carried out in the manner of the so-called seed polymerization. In the present specification, the term "seed polymerization" means a polymerization reaction with other monomer(s) in an aqueous medium in which resin particles are present. Therefore, the fluorine-containing composite resin mentioned above means a seed polymer after said seed polymerization, and said resin particles means seed particles in said seed polymerization.

The fluororesin (2), which is a fluoroolefin copolymer, is described in the following.

Said fluoroolefin is not particularly restricted but includes, among others, vinylidene fluoride (VdF), tetrafluoroethylene (TFE), chlorotrifluoroethylene (CTFE) and hexafluoropropylene (HFP). Said fluoroolefin copolymer is not particularly restricted but includes, among others, VdF/TFE copolymers, VdF/CTFE copolymers, VdF/HFP copolymers, TFE/CTFE copolymers, TFE/HFP copolymers, CTFE/HFP copolymers, VdF/TFE/CTFE copolymers, VdF/TFE/HFP copolymers, VdF/CTFE/HFP copolymers, VdF/TFE/CTFE copolymers, VdF/TFE/HFP copolymers, VdF/CTFE/HFP copolymers, TFE/CTFE/HFP copolymers, VdF/TFE/CTFE/HFP copolymers and the like.

Said fluoroolefin copolymer constituting seed particles is preferably a VdF-based copolymer which is a copolymer of VdF and fluoroolefin(s) other than VdF, more preferably a copolymer containing not less than 70mole percent of VdF. When VdF accounts for not less than 70 mole percent, the compatibility of the seed particles and the polymer derived from an acrylic monomer(s) becomes good.

The mean particle size of said seed particles is closely related to the mean particle size of the fluorine-containing composite resin after seed polymerization. For the fluorine-containing composite resin after seed polymerization to have a mean particle size of 50 to 300 nm, it is preferred that the seed particles size be 40 to 290 nm.

Said seed particle-constituting copolymer can be obtained by ordinary emulsion polymerization techniques. For example, it can be prepared by emulsion polymerization of a monomer mixture containing the fluoroolefin mentioned above in the presence of 0.01 to 1.0% by weight, relative to water, of the hydrophilic site-containing, fluorinated reactive emulsifier and 0 to 1.0% by weight, relative to water, of a fluorinate emulsifier.

It can be prepared also by emulsion polymerization of a monomer mixture containing said fluoroolefin in the presence of not more than 1.0% by weight, preferably not more than 0.5% by weight, more preferably not more than 0.2% by weight (the lower limit generally being 0.01% by weight), relative to water, of a fluorinated surfactant and 0.001 to 0.1% by weight, preferably 0.01 to 0.05% by weight, relative to water, of a nonionic fluorine-free surfactant. The aqueous dispersion obtained by such a method can stably contain seed particles with a mean particle size of not greater than 0.2 $\mu$m at a high concentration of 30 to 50% by weight.

As said fluorine-containing reactive emulsifier having a hydrophilic site, there may be mentioned, among others, those having a structure represented by $CF_2=CF-(CF_2CFX)_nY$ (in which X represents F or $CF_3$, Y represents $SO_3M$ or COOM (M being a hydrogen atom, an amine, ammonium or an alkali metal) and n represents an integer), $CF_2=CF-O(CFX)_nY$ (in which X, Y and n are as defined above), $CH_2=CF-CF_2-O(CF(CF_3)CF_2O)_n-CF(CF_3)Y$ (in which Y and n are as defined above) or $CF_2=CF-CF_2-O(CF(CF_3)CF_2O)_n-CF(CF_3)Y$ (in which Y and n are as defined above). From the viewpoint of solubility in water and surface activity, n is preferably within the range of 0 to 3.

More specifically, those having the structure $CF_2=CF-CF_2-O(CF(CF_3)CF_2O)_n-CF(CF_3)COOH$ in which n is 0 to 2 are preferred.

The polymerization temperature is 20 to 120° C., preferably 30 to 70° C. When the polymerization temperature is below 20° C., the resulting latex generally has low stability. At a polymerization temperature higher than 120 ° C., there is a tendency toward a reduced rate of the polymerization due to chain transfer. The polymerization is generally carried out by heating for 5 to 100 hours under a pressure of 1.0 to 50 kgf/cm$^2$ (gauge pressure), although the conditions may vary depending on the polymer species.

As the above-mentioned fluorinated emulsifier to be used in such seed polymerization, there may be mentioned one or a mixture of two or more of compounds containing a fluorine atom or atoms in their structure and having surface tension modifying activity. For example, there may be mentioned acids represented by X(CF$_2$)$_n$COOH (in which n represents an integer of 6 to 20 and X represents For a hydrogen atom) and alkali metal salts, ammonium salts, amine salts or quaternary ammonium salts thereof; acids represented by Y(CH$_2$CF$_2$)$_m$COOH (in which m represents an integer of 6 to 13 and Y represents F or a chlorine atom) and alkali metal salts, ammonium salts, amine salts or quaternary ammonium salts thereof, and the like. More specifically, there maybe mentioned ammonium perfluorooctanoate, ammonium perfluorononanoate and the like. Other known fluorinated surfactants may also be used.

In the emulsion polymerization for obtaining seed particles, a small amount of a nonionic fluorine-free surfactant may also be used in the presence of a fluorinated surfactant. As typical examples thereof, there may be mentioned polyoxyethylene alkyl ethers, polyoxyethylene alkylphenyl ethers, polyoxyethylene alkyl esters, sorbitan alkyl esters, polyoxyethylenesorbitan alkyl esters, glycerol esters and derivatives thereof.

More specifically, said polyoxyethylene alkyl ethers include polyoxyethylene lauryl ether, polyoxyethylene cetyl ether, polyoxyethylene stearyl ether, polyoxyethylene oleyl ether, polyoxyethylene behenyl ether, etc.; said polyoxyethylene alkylphenyl ethers include polyoxyethylene nonylphenyl ether, polyoxyethylene octylphenyl ether, etc.; said polyoxyethylene alkyl esters include polyethylene glycol monolaurate, polyethylene glycol monooleate, polyethylene glycol monostearate, etc.; said sorbitan alkyl esters include polyoxyethylenesorbitan monolaurate, polyoxyethylenesorbitan monopalmitate, polyoxyethylenesorbitan monostearate, polyoxyethylenesorbitan monooleate, etc.; and said glycerol esters include glyceryl monomyristate, glyceryl monostearate, glyceryl monooleate, etc.

As the derivatives of these, there may be mentioned polyoxyethylenealkylamines, polyoxyethylenealkylphenyl formaldehyde condensates, polyoxyethylene alkyl ether phosphate salts and so on. Particularly preferred are those polyoxyethylene alkyl ethers and polyoxyethylene alkyl esters which have an HLB value of 10 to 18, specifically polyoxyethylene lauryl ether (EO:5-20; EO is the number indicating the number of ethylene oxide units) and polyethylene glycol monostearate (EO:6-10).

The above-mentioned acrylic monomer to be used in the present invention is not particularly restricted but may be an alkyl acrylate whose alkyl moiety contains 1 to 18 carbon atoms, an alkyl methacrylate whose alkyl moiety contains 1 to 18 carbon atoms, an ethylenically unsaturated bond-containing monomer copolymerizable with these, or the like.

As said alkyl acrylate whose alkyl moiety contains 1 to 18 carbon atoms, there may be mentioned, among others, methyl acrylate, ethyl acrylate, n-propyl acrylate, i-propyl acrylate, n-butyl acrylate, i-butyl acrylate, t-butyl acrylate, 2-ethylhexyl acrylate, cyclohexyl acrylate, n-hexyl acrylate, t-butylcyclohexyl acrylate, stearyl acrylate, lauryl acrylate and the like.

As said alkyl methacrylate whose alkyl moiety contains 1 to 18 carbon atoms, there may be mentioned, among others, methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, cyclohexyl methacrylate, n-hexyl methacrylate, t-butylcyclohexyl methacrylate, stearyl methacrylate, lauryl methacrylate and the like.

A polyfunctional monomer such as ethylene glycol dimethacrylate or propylene glycol dimethacrylate may also by used for copolymerization for the purpose of improving the solvent resistance and water resistance.

As the monomer having an ethylenically unsaturated bond copolymerizable with the acrylic ester and/or methacrylic ester mentioned above, there may be mentioned, among others, those mentioned below under (I) and (II).

(I) Monomers having a reactive functional group, for example, ethylenically unsaturated carboxylic acids such as maleic acid, itaconic anhydride, succinic anhydride, crotonic acid, etc.; amide compounds such as acrylamide, methacrylamide, N-methylacrylamide, N-methylolacrylamide, N-butoxymethylacrylamide, N-methylolmethacrylamide, N-methylmethacrylamide, N-butoxymethylmethacrylamide, etc.; hydroxyl-containing monomers such as hydroxyethyl acrylate, hydroxyethyl methacrylate, hydroxypropyl acrylate, hydroxypropyl methacrylate, etc.; epoxy-containing monomers such as glycidyl acrylate, glycidyl methacrylate, etc.; silanol-containing monomers such as γ-trimethoxysilane methacrylate, γ-triethoxysilane methacrylate, etc.; aldehyde-containing monomers such as acrolein etc.; caprolactone-modified hydroxy acrylates, and caprolactone-modified hydroxy methacrylates.

(II) Other vinyl compounds, for example, α-olefins such as ethylene, propylene, isobutylene, etc.; vinyl ethers such as ethyl vinyl ether (EVE), cyclohexyl vinyl ether (CHVE), hydroxybutyl vinyl ether (HBVE), butyl vinyl ether, isobutyl vinyl ether, methyl vinyl ether, polyoxyethylene vinyl ether, etc.; alkenyl compounds such as polyoxyethylene allyl ether, ethyl allyl ether, hydroxyethyl allyl ether, allyl alcohol, allyl ether, etc.; vinyl esters such as vinyl acetate, vinyl lactate, vinyl butyrate, vinyl pivalate, vinyl benzoate, VEOVA 9 and VEOVA 10 (products of Shell), etc.; ethylenically unsaturated carboxylic acids such as itaconic anhydride, succinic anhydride, crotonic acid, etc.; aromatic vinyl compounds such as styrene, α-methylstyrene, p-tert-butylstyrene, etc.; acrylonitrile, and the like.

Use may also be made, as the monomer having an ethylenically unsaturated bond copolymerizable with the acrylic ester and/or methacrylic ester mentioned above, of compounds containing, within the molecule thereof, a low-molecular-weight polymer or oligomer containing hydrophilic site. The hydrophilic site means a site having a hydrophilic group or a site having a hydrophilic bond, or a site comprising a combination of these. Said hydrophilic group may be an ionic, nonionic or amphoteric one or a combination of these. Nonionic or anionic hydrophilic groups are preferred, however. Any known reactive emulsifier may also be used as said monomer.

As said monomer having an ethylenically unsaturated bond copolymerizable with the acrylic ester and/or methacrylic ester mentioned above or as the reactive emulsifier, there may be mentioned, for example, polyethylene glycol methacrylate, polypropylene glycol methacrylate, methoxypolyethylene glycol methacrylate, polyethylene glycol acrylate, polypropylene glycol acrylate, methoxypolyethylene glycol acrylate, polyethylene glycol allyl ether, methoxypolyethylene glycol allyl ether, polyethylene glycol-polypropylene glycol monomethacrylate, polyethylene glycol-polytetramethylene glycol monomethacrylate, polyoxyethylene alkylallylphenyl ether, polyoxyethylene alkylallylphenyl ether sulfuric acid salts, styrenesulfonic acid salts, allylalkylsulfonic acid salts, polyethylene glycol methacrylate sulfate salts, alkylallylsulfosuccinic acid salts, bis(polyoxyethylene-polycyclicphenyl ether) methacrylated sulfuric acid ester salts, polyoxyethylene alkylphenyl ether acrylates, methacryloyloxypolyoxyalkylene sulfate salts, methacryloyloxyalkylene sulfate salts, polyoxyethylene vinyl ether, polyoxyethylene vinyl esters, and so on.

When, in the present invention, the acrylic monomer mentioned above is subjected to seed polymerization in the presence of fluororesin particles, the fluororesin is first swelled with said acrylic monomer and, at that time point, an aqueous dispersion is formed in which said acrylic monomer is dissolved uniformly. Then, upon addition of a polymerization initiator, said acrylic monomer polymerizes, whereupon compatible particles with molecular chains entangles. When said acrylic monomer is polyfunctional, a interpenetration network (IPN) structure can also be formed. As such polyfunctional acrylicmonomer, there may be mentioned, among others, monoglycol dimethacrylate, diglycol dimethacrylate and the like.

The seed polymerization of said acrylic monomer can be carried out in the conventional manner, for example by adding the acrylic monomer all at once to the reaction system in the presence of fluororesin particles, by adding a portion of the acrylic monomer to the reaction system and, after reaction thereof, adding the remaining portion continuously or portionwise, or by continuously adding the total amount of the acrylic monomer to the reaction system. The polymerization conditions for said seed polymerization are the same as those used in ordinary emulsion polymerization. Thus, for example, the polymerization can be carried out by adding a surfactant, polymerization initiator, and chain transfer agent and, optionally, a chelating agent, pH adjusting agent, solvent, etc., to the aqueous medium containing fluororesin particles and allowing the reaction to proceed at a temperature of 10 to 90° C. for 0.5 to 40 hours.

Said surfactant may be an anionic or nonionic one or a combination of an anionic one and a nonionic one. In certain instances, an amphoteric surfactant may also be used.

As said anionic surfactant, there may be mentioned, among others, hydrocarbon type anionic surfactants such as higher alcohol sulfates, sodium alkylsulfonates, sodium alkylbenzenesulfonates, dialkyl succinate sulfonic acid sodium salts, sodium sulfonate, disodium alkyldiphenyl ether disulfonates, etc. and, furthermore, fluorine-containing anionic surfactants such as fluoroalkylcarboxylic acid salts, fluoroalkylsulfonic acid salts, fluoroalkyl sulfates, etc.

As said nonionic surfactant, there may be mentioned, among others, polyoxyethylene alkyl ethers, polyoxyethylene alkylphenyl ethers, polyoxyethylene alkyl esters, polyoxyethylene alkylphenyl esters, sorbitan alkyl esters, glycerol esters, and derivatives of these.

As said amphoteric surfactant, there may be mentioned, for instance, laurylbetaine and the like.

It is also possible to use the so-called reactive emulsifier copolymerizable with the acrylic monomer as said surfactant. Further, it is possible to use such reactive emulsifier in combination with the emulsifier mentioned above.

The above-mentioned surfactant is used generally in an amount of 0.05 to 5.0 parts by weight per 100 parts by weight of the acrylic monomer.

The polymerization initiator to be used in the seed polymerization mentioned above is not particularly restricted provided that it generates radicals available for the free radical reaction in the aqueous medium within the temperature range of 10 to 90° C. In some instances, said initiator may be used in combination with a reducing agent. As such, there may be mentioned generally water-soluble polymerization initiators such as persulfuric acid salts and hydrogen peroxide, and reducing agents such as sodium pyrosulfite, sodium hydrogen sulfite, sodium L-ascorbate, and Rongalite, as well as oil-soluble polymerization initiators such as diisopropyl peroxydicarbonate (IPP), benzoyl peroxide, dibutyl peroxide and azobisisobutyronitrile (AIBN).

The polymerization initiator is used generally in an amount of 0.05 to 2.0 parts by weight per 100 parts by weight of the acrylic monomer.

The chain transfer agent to be used in the above seed polymerization includes, among others, halogenated hydrocarbons such as chloroform and carbon tetrachloride, and mercaptans such as n-dodecylmercaptan, tert-dodecylmercaptan and n-octylmercaptan. The chain transfer agent is used generally in an amount of 0 to 5.0 parts by weight per 100 parts by weight of the acrylic monomer.

In the above seed polymerization, the solvent is used within limits within which the workability, safety from disasters, environmental safety and process safety will not be impaired, for example in an amount of not more than 20% by weight. There may be mentioned, for example, methyl ethyl ketone, acetone, trichlorotrifluoroethane, methyl isobutyl ketone, cyclohexanone, methanol, ethanol, propanol, butanol, ethyl cellosolve, butyl cellosolve, methyl carbitol, ethyl carbitol, butyl carbitol, dioxane, butyl carbitol acetate, thexanol, ethyl acetate and butyl acetate.

The addition of such solvent may result in an improvement in the swellability of fluororesin particles with the acrylic monomer in some instances.

In the practice of the present invention, the particle size of the fluororesin particles in the aqueous dispersion is preferably 50 to 300 nm, more preferably 50 to 200 nm.

When said particle size is less than 50 nm, the aqueous fluororesin dispersion will have a markedly increased viscosity within the practical concentration range of 30% or more, causing troubles in the process of coating composition preparation. When said particle size is above 300 nm, the resulting aqueous fluororesin dispersion will be poor in precipitation stability and, even if the resin constitution is the same, an increase in lowest film-forming temperature of the aqueous fluororesin dispersion will result.

In addition to the above-mentioned aqueous dispersion (A-1), the aqueous dispersion of the present invention comprises the aqueous dispersion (A-2). Said aqueous dispersion (A-2) is an aqueous dispersion prepared without seed polymerization of an acrylic resin.

Said aqueous dispersion (A-2) has a basic structure such that fluororesin particles are dispersed in an aqueous medium. The fluororesin constituting said fluororesin particles is a fluororesin (2) which comprises a fluoroolefin copolymer or a fluororesin (1) which comprises a copolymer of a fluoroolefin and a vinyl monomer. Said fluororesin (2), which comprises a fluoroolefin copolymer, is the same as described with regard to the aqueous dispersion (A-1).

As the fluororesin (1), which comprises a copolymer of a fluoroolefin and a vinyl monomer, the following are preferred.

As the fluoroolefins constituting the fluororesin (1), there may be mentioned fluoroolefins containing about 2 to 4 carbon atoms, such as vinyl fluoride (VF), vinylidene fluoride (VdF), tetrafluoroethylene (TFE), chlorotrifluoroethylene (CTFE), hexafluoropropylene (HFP) and trifluoroethylene (TrFE) As said vinyl monomer, there may be mentioned olefins such as ethylene, propylene, isobutylene, etc.; vinyl ethers such as ethyl vinyl ether (EVE), cyclohexyl vinyl ether (CHVE), hydroxybutyl vinyl ether (HBVE), butyl vinyl ether, isobutyl vinyl ether, methyl vinyl ether, polyoxyethylene vinyl ether, etc.; alkenyl compounds such as polyoxyethylene allyl ether, ethyl allyl ether, hydroxyethyl allyl ether, allyl alcohol, allyl ether, etc.; vinyl esters such as vinyl acetate, vinyl lactate, vinyl butyrate, vinyl pivalate, vinyl benzoate, VEOVA 9 (products of Shell) and VEOVA 10 (products of Shell), etc.; and ethylenically unsaturated carboxylic acids such as itaconic anhydride, succinic anhydride, crotonic acid, etc.

As the fluororesin (1) comprising a copolymer of said fluoroolefin and said vinyl monomer, there may be mentioned CTFE/vinyl ether copolymers, CTFE/vinyl ester copolymers, TFE/vinyl ether copolymers, TFE/vinyl ester copolymers, TFE/ethylene copolymers, TFE/propylene copolymers, CTFE/ethylene copolymers, CTFE/propylene copolymers, CTFE/ethylene/vinyl ether copolymers, CTFE/ethylene/vinyl ester copolymers, and derivatives of these copolymers as modified with a small amount of a copolymerizable monomer(s).

Said aqueous dispersion (A-2) can be prepared, for example, by the phase conversion method comprising dispersing the fluororesin particle-constituting fluororesin obtained by polymerization in a solvent, for instance, in water in the presence of an emulsifier and then distilling off the solvent, or by the method comprising carrying out the emulsion polymerization of the fluororesin-constituting fluororesin in an aqueous medium. For reducing the amount of solvent and simplifying the process, the method comprising carrying out the emulsion polymerization in an aqueous medium is preferred.

Said emulsion polymerization can be carried out in the same manner as in ordinary emulsion polymerization processes. Thus, for instance, the desired resin can be obtained by reacting monomers such as a fluoroolefin and a monomer copolymerizable therewith in a tightly closed vessel in an aqueous medium in the presence of a surfactant, polymerization initiator and chain transfer agent and, optionally, a chelating agent, pH adjusting agent and solvent, for instance, at a temperature of 10 to 90° C. for 0.5 to 40 hours.

Said surfactant may be an anionic or nonionic one or a combination of an anionic one and a nonionic one. In certain instances, an amphoteric surfactant may also be used.

As said anionic surfactant, there may be mentioned, among others, hydrocarbon type anionic surfactants such as higher alcohol sulfates, sodium alkylsulfonates, sodium alkylbenzenesulfonates, dialkyl succinate sulfonic acid sodium salts, sodium alkyldiphenyl ether disulfonates, etc. and, furthermore, fluorine-containing anionic surfactants such as fluoroalkylcarboxylic acid salts, fluoroalkylsulfonic acid salts, fluoroalkyl sulfates, etc.

As said nonionic surfactant, there may be mentioned, among others, polyoxyethylene alkyl ethers, polyoxyethylene alkylphenyl ethers, polyoxyethylene alkyl esters, polyoxyethylene alkylphenyl esters, sorbitan alkyl esters, glycerol esters, and derivatives of these.

As said amphoteric surfactant, there may be mentioned, for instance, laurylbetaine and the like.

It is also possible to use the so-called reactive emulsifier as said surfactant. Further, it is possible to use such reactive emulsifier in combination with the emulsifier mentioned above.

The polymerization initiator to be used in the emulsion polymerization mentioned above is not particularly restricted provided that it generates radicals available for the free radical reaction in the aqueous medium within the temperature range of 10 to 90° C. In some instances, said initiator may be used in combination with a reducing agent. As such, there may be mentioned generally water-soluble polymerization initiators such as persulfuric acid salts and hydrogen peroxide, and reducing agents such as sodium pyrosulfite, sodium hydrogen sulfite, sodium L-ascorbate, and Rongalite, as well as oil-soluble polymerization initiators such as diisopropyl peroxydicarbonate (IPP), benzoyl peroxide, dibutyl peroxide and azobisisobutyronitrile (AIBN).

The chain transfer agent to be used in said emulsion polymerization includes, among others, halogenated hydrocarbons such as chloroform and carbon tetrachloride, and mercaptans such as n-dodecylmercaptan, tert-dodecylmercaptan and n-octylmercaptan.

In said emulsion polymerization, the solvent is used within limits within which the workability, safety from disasters, environmental safety and process safety will not be impaired, for example in an amount of not more than 20% by weight. There may be mentioned, for example, methyl ethyl ketone, acetone, trichlorotrifluoroethane, methyl isobutyl ketone, cyclohexanone, methanol, ethanol, propanol, butanol, ethyl cellosolve, butyl cellosolve, methyl carbitol, ethyl carbitol, butyl carbitol, dioxane, butyl carbitol acetate, thexanol, ethyl acetate and butyl acetate.

The "aqueous dispersion" of the present invention has now fully described.

Repeatedly, it to be noted that the fluorine-containing resin (3) of the present invention may be a mixture of a fluororesin and some other resin, so that, when the "aqueous dispersion" mentioned hereinabove is used as a form of the fluorine-containing resin (3) of the present invention, any aqueous dispersion, not only as it is but also in the form of a mixture with some other resin, preferably an acrylic resin, can serve as a form of the fluorine-containing resin (3) of the present invention.

Although the fluorine-containing resin (3) of the present invention has been generally described hereinabove, a supplementary explanation is made of the fluororesin (1), which comprises a copolymer of a fluoroolefin and a vinyl monomer, among the fluororesins constituting the fluorine-containing resins (3) of the present invention, as follows.

Among the fluororesins of the present invention, the fluororesin (1) comprising a copolymer of a fluoroolefin and a vinyl monomer is preferred, and a fluororesin (1a) comprising a copolymer of a fluoroolefin and a specific vinyl monomer is more preferred.

The fluoroolefin constituting the copolymer thereof with a specific vinyl monomer is represented by the formula:

$$CF_2=CFX$$

(wherein X represents a hydrogen, fluorine or chlorine atom or atrifluoromethyl group). Preferred as such fluoroolefin are TFE, CTFE, TrFE and HFP. Most preferred, however, is TFE since the resulting aqueous dispersion composition of the present invention becomes chlorine-free and can form highly durable and tough coatings and since the resulting aqueous dispersion composition of the present invention has an increased fluorine content, hence it is improved in water repellency.

The specific vinyl monomer to be copolymerized with said fluoroolefin includes three types, namely (i) β-methyl-β-alkyl-substituted α-olefins, (ii) vinyl-containing ethers and (iii) vinyl-containing esters. By copolymerizing one of these with the above-mentioned fluoroolefin, said fluororesin (3) is constituted. It is also possible to use two or more of such vinyl monomers and it is further preferred that these are carboxyl-containing vinyl monomers or vinyl monomers having a curing reaction site such as a hydroxyl group, epoxy group or a silyl group. When they have no carboxyl group or curing reaction site, mention is preferably made, apart from these, carboxyl-containing vinyl monomers; vinyl monomers having a curing reaction site such as a hydroxyl, epoxy or silyl group as specific vinyl monomers to be copolymerized with the above-mentioned fluoroolefin.

The above-mentioned β-methyl-β-alkyl-substituted α-olefins (i) are represented by the formula:

$$CH_2=CR^0(CH_3)$$

(wherein $R^0$ represents an alkyl group containing 1 to 8 carbon atoms). Such are not particularly restricted but includes, among others, isobutylene, 2-methyl-1-butene, 2-methyl-1-pentene, 2-methyl-1-hexene and the like. Among them, isobutylene is preferred.

The proportion of said β-methyl-β-alkyl-substituted α-olefin (i) in the copolymer of the fluoroolefin and said specific vinyl monomer is preferably 5 to 45% by weight. When it is less than 5% by weight, the resulting aqueous dispersion composition of the present invention will be poor in weather resistance. If it exceeds 45% by weight, copolymer preparation becomes difficult.

The above vinyl-containing ethers (ii) are alkyl vinyl ethers or alkyl allyl ethers represented by the formula:

$$CH_2=CHR^5$$

(wherein $R^5$ represents $OR^{11}$ or $CH_2OR^{11}$ ($R^{11}$ being an alkyl group containing 1 to 8 carbon atoms)). When these have a hydroxyl group and occur as hydroxyalkyl vinyl ethers or hydroxyalkyl allyl ethers (in this case, $R^{11}$ is a hydroxyl-containing alkyl group), said hydroxyl group functions as a site of reaction with the curing agent to be mentioned hereinafter and such ethers are preferred.

The vinyl-containing ethers (ii) are not particularly restricted but include, among others, ethyl vinyl ether, butyl vinyl ether, hexyl vinyl ether, cyclohexyl vinyl ether, 2-hydroxyethyl vinyl ether, 3-hydroxypropyl vinyl ether, 2-hydroxypropyl vinyl ether, 2-hydroxy-2-methylpropyl vinyl ether, 4-hydroxybutyl vinyl ether, 4-hydroxy-2-methylbutyl vinyl ether, 5-hydroxypentyl vinyl ether, 6-hydroxyhexyl vinyl ether, 2-hydroxyethyl allyl ether, 4-hydroxybutyl allyl ether, glycerol monoallyl ether and the like.

The proportion of said vinyl-containing ether (ii) in the copolymer of said fluoroolefin and said specific vinyl monomer is preferably 1 to 45% by weight. When it is less than 1% by weight, the resulting aqueous dispersion composition of the present invention will be poor in curability. When it exceeds 45% by weight, gelation tends to occur, hence the storage stability will be poor, and further the coatings obtained will be fragile. A more preferred range is 1 to 30% by weight, still more preferably 5 to 15% by weight.

The above-mentioned vinyl-containing esters (iii) are represented by the formula:

$$CHR^{21}=CHR^{31}$$

(wherein $R^{21}$ represents a hydrogen atom or $COOR^{41}$, $R^{31}$ represents $COOR^{41}$ or $OCOR^{41}$ and $R^{41}$ represents an alkyl group containing 1 to 10 carbon atoms, a cycloalkyl group containing 3 to 10 carbon atoms, a fluoroalkyl group containing 1 to 10 carbon atoms or a phenyl group which may be substituted by alkyl group(s) containing 1 to 8 carbon atoms; when $R^{31}$ is $OCOR^{41}$, then $R^{21}$ is a hydrogen atom). More specifically, there may be mentioned vinyl carboxylates represented by the formula:

$$CH_2=CH\ (OCOR^{41})$$

and maleic acid diesters or fumaric acid diesters represented by the formula:

$$(R^{41}OOC)\ CH=CH\ (COOR^{41}).$$

Said vinyl carboxylates are not particularly restricted but include, among others, vinyl acetate, vinyl propionate, vinyl butyrate, vinyl isobutyrate, vinyl pivalate, vinyl caproate, vinyl versatate, vinyl laurate, vinyl stearate, vinyl benzoate, vinyl p-t-butylbenzoate, vinyl salicylate, vinyl cyclohexanecarboxylate, vinyl hexafluoropropionate, vinyl trichloroacetate and the like. Said maleic acid diesters or fumaric acid diesters are not particularly restricted but include, among others, dimethylmaleate, diethylmaleate, dipropylmaleate, dibutyl maleate, diphenyl maleate, dibenzyl maleate, ditrityl maleate, ditrifluoromethyl maleate, ditrifluoroethyl maleate, dihexafluoropropyl maleate, dimethyl fumarate, diethyl fumarate, dipropyl fumarate, dibutyl fumarate, diphenyl fumarate, dibenzyl fumarate, ditrityl fumarate, ditrifluoromethyl fumarate, ditrifluoroethyl fumarate, dihexafluoropropyl fumarate and the like.

The proportion of the vinyl-containing ester (iii) in the copolymer of the fluoroolefin and said specific vinyl monomer is preferably 1 to 45% by weight. When it is less than 1% by weight, the solubility and compatibility will be poor and the glass transition temperature will be low. A proportion exceeding 45% by weight will cause a reduction in weather resistance. A more preferred range is 5 to 40% by weight, still more preferably 10 to 30% by weight.

The carboxyl-containing vinyl monomers already mentioned as specific vinyl monomers other than the above-mentioned (i), (ii) and (iii) improve the dispersibility and curability of the fluorine-containing resin (3) of the present invention and improve the adhesion of the aqueous dispersion composition of the present invention to substrates. As said carboxyl-containing vinyl monomers, there maybe mentioned, for example, those derived from crotonic acid, maleic acid, acrylic acid, methacrylic acid, itaconic acid, vinyl acetate and the like. The proportion of such a carboxyl-containing vinyl monomer in the whole vinyl monomers is preferably 0.01 to 10 mole percent. If it is excessively small, the compatibility with the curing agent will be low. When it is excessively large, the water resistance will be low.

In the curing reaction site-containing vinyl monomers already mentioned as specific vinyl monomers other than the above (i), (ii) and (iii), the curing reaction site is a hydroxyl, epoxy or silyl group. As the vinyl monomers having a hydroxyl group as the curing reaction site, there may be mentioned those hydroxyalkyl vinyl ethers and hydroxyalkyl vinyl esters already mentioned above under (ii), among others.

As other curing reaction site-containing vinyl monomers, there may be mentioned the epoxy-containing vinyl monomers described in Japanese Kokai Publications Hei-02-232250 and Hei-02-232251 and the silyl-containing vinyl monomers described in Japanese Kokai Publication Sho-61-141713, among others.

As said epoxy-containing vinyl monomers, there may be mentioned, for example, epoxy vinyls and epoxy vinyl ethers represented by the following general formula:

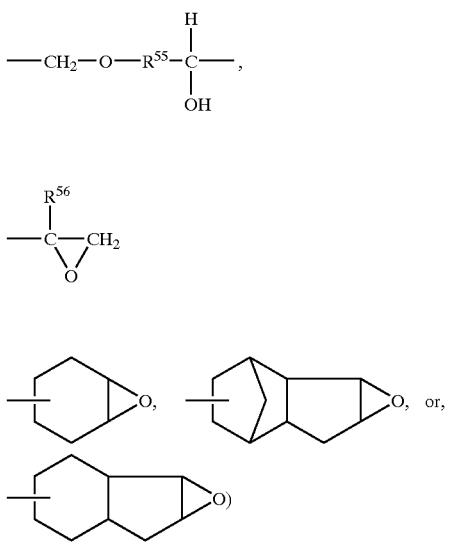

As typical examples of these, there may be mentioned the following:

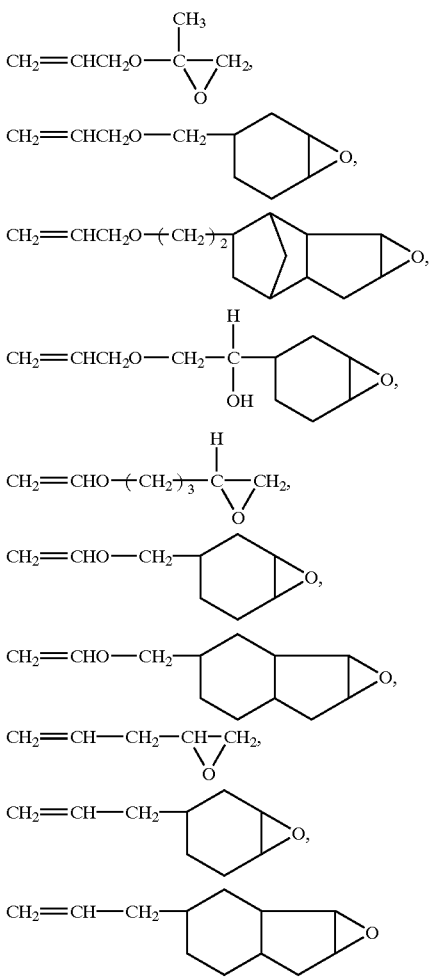

As typical examples of the silyl-containing vinyl monomers mentioned above, there may be mentioned, among others, vinyltrimethoxysilane, vinyltriethoxysilane, vinyltripropoxysilane, vinylmethyldimethoxysilane, vinyldimethylmethoxysilane, vinylmethyldiethoxysilane, vinyltris(β-methoxy)silane, trimethoxysilylethyl vinyl ether, triethoxysilylethyl vinyl ether, trimethoxysilylbutyl vinyl ether, trimethoxysilylethyl vinyl ether, trimethoxysilylpropyl vinyl ether, triethoxysilylpropyl vinyl ether, vinyltriisopropenyloxysilane, vinylmethyldiisopropenyloxysilane, triisopropenyloxysilylethyl vinyl ether, triisopropenyloxysilylpropyl vinyl ether, triisopropenyloxysilylbutyl vinyl ether, vinyltris(dimethyliminoxy)silane, vinyltris(methyl-ethyliminoxy)silane, vinylmethylbis(methyldi-methyliminoxy)silane, vinyldimethyl(dimethyliminoxy)silane, tris(dimethyliminoxy)silylethyl vinyl ether, methylbis(dimethyliminoxy)silylethyl vinyl ether, tris(dimethyliminoxy) silylbutyl vinyl ether, γ-(meth)acryloyloxypropyltrimethoxysilane, γ-(meth)acryloyloxypropyltriethoxysilane, γ-(meth)acryloyloxypropylmethyldimethoxysilane, γ-(meth)acryloyloxypropyltriisopropenyloxysilane, γ-(meth)acryloyloxypropyltris(dimethyliminoxy)silane, γ-(meth)acryloyloxypropyltris(dimethyliminoxy)silane, allyltrimethoxysilane and the like.

The proportion of such a curing reaction site-containing vinyl monomer in the whole vinyl monomers is not critical but is preferably 5 to 15 mole percent. If it is excessively small, the curability may be insufficient. If it is excessively large, gelation tends to occur and the storage stability will be poor.

The copolymer of the fluoroolefin and said specific vinyl monomer can be prepared by polymerizing the monomers mentioned above by ordinary polymerization techniques. As such polymerization techniques, there may be mentioned, for instance, those methods mentioned in detail hereinabove relating to the methods of polymerization of the seed particle-constituting fluororesin in the section of aqueous fluororesin dispersion (A-1) with an acrylic resin incorporated therein by seed polymerization.

The fluorine-containing resin (3) of the present invention has now fully described. The description given above is summarized in the following:

① The fluorine-containing resin (3) of the present invention occurs as an aqueous dispersion.

② The fluorine-containing resin (3) of the present invention comprises a fluororesin or a mixture of a fluororesin and other resin(s).

③ Said other resin constituting the fluorine-containing resin (3) of the present invention is preferably an acrylic resin.

④ One species of the fluororesin constituting the fluorine-containing resin (3) of the present invention is a copolymer of a fluoroolefin and a vinyl monomer. In this case, too, said fluorine-containing resin (3) comprises a fluororesin or a mixture of a fluororesin and other resin(s) (particularly an acrylic resin).

⑤ One species of the fluororesin constituting the fluorine-containing resin (3) of the present invention is a copolymer of fluoroolefins. In this case, too, said fluorine-containing resin (3) comprises a fluororesin or a mixture of a fluororesin and other resin(s) (particularly an acrylic resin).

⑥ In the above case ⑤, said fluoroolefin copolymer is preferably a copolymer of vinylidene fluoride and a fluoroolefin other than vinylidene fluoride. In this case, too, said fluorine-containing resin (3) comprises a fluororesin or a mixture of a fluororesin and other resin(s) (particularly an acrylic resin).

⑦ In the above case ⑥, the fluorine-containing resin (3) is preferably a fluororesin with an acrylic resin incorporated therein by seed polymerization. In this case, too, said fluorine-containing resin (3) comprises a fluororesin or a mixture of a fluororesin and other resin(s) (particularly an acrylic resin).

The constitution of the fluorine-containing resin (3) has been fully described hereinabove. In cases where the fluorine-containing resin (3) has a curing reaction site, a curing agent capable of reacting with said curing reaction site may be used as desired for the purpose of improving the durability and solvent resistance of the coatings formed from the aqueous dispersion composition of the present invention. Said curing agent is not particularly restricted but includes, among others, isocyanate-based curing agents, melamine-based curing agents and the like.

Since the repellent (1), organosilicon compound (2) and fluorine-containing resin (3) have been described, the aqueous dispersion composition of the present invention containing these is described in the following.

The aqueous dispersion composition of the present invention can be obtained by admixing an aqueous dispersion of said repellent (1) and organosilicon compound (2) and said fluorine-containing resin (3), which occurs as an aqueous dispersion. The admixing can be conducted by selecting an adequate method from among ordinary methods of admixing, for example by stirring the three components using a stirrer such as a homomixer.

The proportions of said three components as expressed in terms of respective solid weights are preferably such that the value [(repellent (1))+(organosilicon compound (2)]/ (fluorine-containing resin (3) amounts to not less than 1. When said value is less than 1, the surface of the article coated with the aqueous dispersion composition of the present invention tends to assume a wet color, hence is inferior in decorative quality.

It is further preferred that the value (repellent (1))/ (organosilicon compound (2)), on the solids weight ratio basis, amounts to not less than 0.005 and not more than 200. When said value is less than 0.005 or exceeds 200, the water resistance will be poor.

In preparing the aqueous dispersion composition of the present invention, one or more appropriate additives may be incorporated therein in addition to the above components. Such additives are not particularly restricted but include, among others, known additives in ordinary use, such as pigments, preservatives, antibacterial agents, antifungal agents, fire retardants, surface modifiers, curing catalysts, viscosity modifiers, leveling agents, ultraviolet absorbers, antiskinning agents, dispersants, antifoams and the like. The amounts of addition of these are not particularly restricted but respective ordinary addition amounts can be employed.

By adding an antimicrobial agent (preservative, antifungal agent) to the aqueous dispersion composition of the present invention, the effects as preservative and antifungal coatings can be produced simultaneously. Furthermore, according to the additive species, the composition may be applied as a water-proofing composition or a filthy-water pollution preventing composition or the like. To provide such an aqueous dispersion composition having antifungal effects is also one of the objects of the present invention.

Said antimicrobial agent is not particularly restricted but includes, among others, Nopcocide SN-135 (product of San Nopco), Nopcocide N-54-D (ditto), Marinecide SN-707 (ditto), Nopcocide SN-215 (ditto), Nopcocide 96 (ditto), Deltop (product of Takeda Chemical Industries), Slaoff S (ditto), Slaoff 95 (ditto), Deltop 110 (ditto), Coatcide D (ditto), Coatcide 55D (ditto), Monicide WG (ditto), Slaoff AB (ditto), Slargen L (ditto), Baikam AK-LN (product of Otsuka Chemical), Baikam AK-LS (ditto) and so forth.

The reason why the aqueous dispersion composition of the present invention has very good waterproofing and decorating properties is not very clear but it is conceivable that the repellent (1) and organosilicon compound (2) the proportions of which are defined as mentioned above acquire excellent waterproofing effects and the fluorine-containing resin (3) contained at the same time provide such durability as can endure long periods of use.

As the porous construction and building materials to which the aqueous dispersion composition of the present invention can be applied, there may be mentioned, among others, porous inorganic construction and building materials such as architectural concrete, lightweight concrete, precast concrete, autoclaved lightweight concrete (ALC), asbestos slates, mortar, calcium silicate boards, pulp cement boards, cemented excelsior boards, gypsum boards, hard boards, plaster, bricks, blocks, tiles, gypsum plaster, dolomite plaster, natural stones, artificial stones, and glass wool; and porous organic construction and building materials such as lumbres, plywoods, and particle boards.

In addition to the application target articles or substrates mentioned above, the aqueous dispersion composition of the present invention can be applied to articles containing moisture and requiring stronger durability. As such articles, there may be mentioned, among others, tents, curtains, roller blinds, cloths for umbrellas and the like; and wood products such as benches, shelves, walls and so on.

The coated articles derived from such articles or substrates by coating with the aqueous dispersion composition of the present invention also constitute one aspect of the present invention.

The method of applying the aqueous dispersion composition of the present invention for the production of coated articles of the present invention is not particularly restricted but, for example, the air spray or airless spray coating, brush coating, roller coater coating, dipping or like coating techniques can adequately be employed. The coating thickness of the aqueous dispersion composition of the present invention in said coated articles is not particularly restricted but a coverage of about 1 to 20 grams/m$^2$, for instance, is preferred.

BEST MODES FOR CARRYING OUT THE INVENTION

The following examples illustrate the present invention in further detail. These examples, however, are by no means limitative of the scope of the present invention.

Repellent (1)

Unidyne TG-410 (product of Daikin Industries) was used.

Organosilicon compound (2)

Mixing 20 g of n-Hexyltriethoxysilane, 4 g of polyoxyethylene stearyl ether and 0.02 g of sodium laurate together, 80 g of water was added gradually while stirring at a high speed of 1,500 rpm, to give a white aqueous emulsion. This was designated as organosilicon compound (2) in Table 1.

Fluorine-containing resin (3)

A fluorine-containing resin (3) was prepared in the following manner.

A one-liter pressure reaction vessel equipped with a stirrer was charged with 500 mL of deionized water, 0.5 g of ammonium perfluorooctanoate and 5.0 g of a reactive emulsifier having a structure represented by $CH_2=CF-CF_2-OCF(CF_3)CF_2O-CF(CF_3)COOH$, and the residual air was removed by repeated nitrogen gas introduction under pressure and degassing. Then, a monomer mixture composed of VdF/TFE/CTFE (74/14/12 mole percent) was introduced under pressure into the vessel at 60° C. until the internal pressure had risen to 8 kgf/cm². Then, 1.5 g of ethyl acetate was introduced under pressure and 0.2 g of ammonium persulfate was further added. The above monomer mixture was fed continuously in such a manner that the internal pressure of the vessel was maintained at 8 kgf/cm². In this manner, the polymerization was carried out for 45 hours. Then, the vessel was returned to ordinary temperature and ordinary pressure and the polymerization was thus terminated, whereby an aqueous copolymer dispersion was obtained. Elemental analysis revealed that a copolymer composed of VdF/TFE/CTFE=74/14/12 (mole percent) was obtained.

A 200-mL four-necked flask equipped with a stirring blade, condenser and thermometer was charged with 70 g of the above aqueous copolymer dispersion, and JS 2 (product of Sanyo Chemical Industries) was added thereto in an amount of 0.5% by weight relative to the solid matter in the above aqueous copolymer dispersion. The flask was heated on a water bath with stirring and, after the flask inside temperature reached 80° C., an emulsion of 10 g of methyl methacrylate (MMA), 1.2 g of cyclohexyl methacrylate, 1.5 g of PKA 5003 (product of Nippon Oil & Fats) and 0.3 g of isooctyl thioglycolate as emulsified in a 0.5% (by weight) aqueous solution of JS 2 was added dropwise over 1 hour. Immediately thereafter, 1 mL of a 2% (by weight) aqueous solution of ammonium persulfate was added to initiate the reaction. At 3 hours after initiation of the reaction, the flask inside temperature was raised to 85° C. and this temperature was maintained for 1 hour. Then, the flask was cooled, the pH was adjusted to 7 with aqueous ammonia, and the flask contents were filtered through a 300-mesh wire gauze, to give a blue-white aqueous resin dispersion. This was designated as fluorine-containing resin (3) and used in the examples.

Acrylic Emulsion Resin

A four-necked flask was charged with 3 weight parts of sodium laurylsulfonate and 160 weight parts of deionized water. The temperature was raised to 60° C. in a nitrogen stream and 0.5 weight part of ammonium persulfate and 0.2 weight part of sodium hydrogensulfite were added. Then, 100 weight parts of a mixture of methyl methacrylate/ethyl methacrylate/n-butyl methacrylate=63/30/7 (mole percent) was added dropwise over 3 hours. During the dropping, the temperature was controlled within the range of 60 to 70° C.

After completion of the dropping, the reaction was allowed to proceed by continuing stirring within the same temperature range for 2 hours, followed by cooling. Thereafter, the pH was adjusted to 8 to 9 with 15% ammonia water, to give a stable emulsion with a solid content of 30%. This was used under the designation "acrylic emulsion resin".

Antimicrobial Agent

A 10:3 (by weight) mixture of Nopcocide N-54-D (product of San Nopco) and Marinecide SN-7017 (product of San Nopco) was used.

EXAMPLES AND COMPARATIVE EXAMPLES

Slate boards were used as substrates. Each test composition was applied to the surface of a slate board at 5 g/m² of a solid content, and the appearance was observed and the angle of contact with water determined in the manner mentioned below. Thereafter, the coated slate board was subjected to 1,000 hours and 2,000 hours of SWOM (sunshine weather-o-meter) testing, and the appearance and the angle of contact with water were determined in the same manner. The results thus obtained are shown in Table 1.

Appearance

The surface of the substrate slate board was measured for chromaticity using a testing apparatus manufactured by Nippon DenshokuKogyo. After coating of each test composition and drying, the chromaticity was measured in the same manner. The color difference ($\Delta E$) was then calculated and evaluated as follows:

○: The color difference is less than 1.

Δ: The color difference is 1 to 2.

X: The color difference is above 2.

Angle of Contact with Water

The angle of contact with water was determined before application of each test composition and after application and drying in the same manner as mentioned above. The measurement was performed by the droplet method. The model CA-DT testing apparatus manufactured by Kyowa Kaimen Kagaku was used. The numerical values in Table 1 are expressed in degrees (°)

Water Running Test

Distilled water was allowed to drop at a right angle onto the coated test board from a height of 20 cm at a rate of 1,000 ml/minute for 1 minute. Then, the coated test board was tilted through an angle of 45° and, after allowing it to stand for 1 minute, the appearance of the coated surface was grossly observed. The following evaluation criteria were used:

○: Water drops roll down.

Δ: Water drops form and remain on to some extent.

X: Water drops do not form but the surface assumes a wet color.

TABLE

| | Ex. 1 | Ex. 2 | Ex. 3 | Ex. 4 | Ex. 5 | Ex. 6 | Ex. 7 | Comp. Ex. 1 | Comp. Ex. 2 | Comp. Ex. 3 |
|---|---|---|---|---|---|---|---|---|---|---|
| Formulation (wt. Parts) | | | | | | | | | | |
| Repellent (1) | 5 | 90 | 47.5 | 10 | 80 | 45 | 10 | 0 | 0 | 0 |
| Organosilicon compound (2) | 90 | 5 | 47.5 | 80 | 10 | 45 | 80 | 95 | 90 | 100 |
| Fluorine-containing resin (3) | 5 | 5 | 5 | 10 | 10 | 10 | 10 | 5 | 10 | 0 |
| Acrylic emulsion resin | 0 | 0 | 0 | 0 | 0 | 0 | 0 | 0 | 0 | 0 |
| Antimicrobial agent | 0 | 0 | 0 | 0 | 0 | 0 | 0.02 | 0 | 0 | 0 |
| Before SWOM testing | | | | | | | | | | |
| Appearance | ○ | ○ | ○ | ○ | ○ | ○ | ○ | ○ | ○ | ○ |
| Angle of contact with water | 130 | 132 | 131 | 130 | 135 | 130 | 130 | 122 | 126 | 125 |

TABLE-continued

| | | | | | | | | | | |
|---|---|---|---|---|---|---|---|---|---|---|
| Water running test After 1000 hours of SWOM testing | ○ | ○ | ○ | ○ | ○ | ○ | ○ | ○ | ○ | x |
| Appearance | ○ | ○ | ○ | ○ | ○ | ○ | ○ | ○ | ○ | ○ |
| Angle of contact with water | 130 | 132 | 131 | 130 | 135 | 130 | 131 | 116 | 122 | not more than 10 |
| Water running test After 2000 hours of SWOM testing | ○ | ○ | ○ | ○ | ○ | ○ | ○ | ○~Δ | ○~Δ | x |
| Appearance | ○ | ○ | ○ | ○ | ○ | ○ | ○ | Δ | Δ | x |
| Angle of contact with water | 122 | 123 | 124 | 125 | 125 | 122 | 124 | 52 | 58 | not more than 10 |
| Water running test | ○ | ○ | ○ | ○ | ○ | ○ | ○ | ○~Δ | ○~Δ | x |

| | Comp. Ex. 4 | Comp. Ex. 5 | Comp. Ex. 6 | Comp. Ex. 7 | Comp. Ex. 8 |
|---|---|---|---|---|---|
| Formulation (wt. Parts) | | | | | |
| Repellent (1) | 100 | 50 | 0 | 45 | 0 |
| Organosilicon compound (2) | 0 | 50 | 0 | 45 | 0 |
| Fluorine-containing resin (3) | 0 | 0 | 100 | 0 | 0 |
| Acrylic emulsion resin | 0 | 0 | 0 | 5 | 100 |
| Antimicrobial agent | 0 | 0 | 0 | 0 | 0 |
| Before SWOM testing | | | | | |
| Appearance | ○ | ○ | x | ○ | x |
| Angle of contact with water | 130 | 125 | 80 | 123 | 75 |
| Water running test | ○ | ○ | Δ | ○ | Δ |
| After 1000 hours of SWOM testing | | | | | |
| Appearance | ○ | ○ | x | x | x |
| Angle of contact with water | 48 | 40 | 77 | 42 | not more than 10 |
| Water running test | Δ | Δ | Δ | x | x |
| After 2000 hours of SWOM testing | | | | | |
| Appearance | x | x | x | x | x |
| Angle of contact with water | not more than 10 | not more than 10 | 73 | not more than 10 | not more than 10 |
| Water running test | x | x | Δ | x | x |

INDUSTRIAL APPLICABILITY

The aqueous dispersion composition of the present invention, which has the constitution mentioned above, is excellent in both waterproofing and decorating properties and is very suited for use as a coating composition for porous construction and building materials and the like.

What is claimed is:

1. An aqueous dispersion composition which comprises a repellent (1), an organosilicon compound (2) represented by the general formula (I):

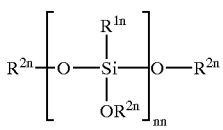

(I)

wherein $R^{1n}$ represents a saturated alkyl group containing 1 to 18 carbon atoms and, when nn is 2 or more, the $R^{1n}$ groups may be the same or different; $R^{2n}$ represents a saturated alkyl group containing 1 to 5 carbon atoms and, when nn is 2 or more, the $R^{2n}$ groups may be the same or different; and nn represents an integer of 1 to 20, and a fluorine-containing resin (3).

2. The aqueous dispersion composition according to claim 1, wherein said fluorine-containing resin (3) occurs as an aqueous dispersion.

3. The aqueous dispersion composition according to claim 1, wherein said fluorine-containing resin (3) comprises a fluororesin or a mixture of a fluororesin and other resin(s).

4. The aqueous dispersion composition according to claim 3, wherein said other resin is an acrylic resin.

5. The aqueous dispersion composition according to claim 3, wherein said fluororesin is a copolymer of a fluoroolefin and a vinyl monomer.

6. The aqueous dispersion composition according to claim 3, wherein said fluororesin is a copolymer of fluoroolefins.

7. The aqueous dispersion composition according to claim 6, wherein said copolymer of fluoroolefins is a copolymer of vinylidene fluoride and a fluoroolefin other than vinylidene fluoride.

8. The aqueous dispersion composition according to claim 1, wherein the proportions, on the solid weight basis, of the repellent (1), organosilicon compound (2) and fluorine-containing resin (3) are such that the ratio repellent (1)+ organosilicon compound (2)/ fluorine-containing resin (3) amounts to not less than 1 and the ratio repellent (1)/ organosilicon compound (2) amounts to not less than 0.005 and not more than 200.

9. A coated article which is obtained by being coated with the aqueous dispersion composition according to claim 1, 2, or 3.

10. The coated article according to claim 9, wherein the coated substrate constituting the coated article is a porous construction or building material having a porous surface.

11. The coated article according to claim 10, wherein said porous construction or building material is concrete.

12. The aqueous dispersion composition according to claim 4, wherein said fluororesin is a copolymer of a fluoroolefin and a vinyl monomer.

13. The aqueous dispersion composition according to claim 4, wherein said fluororesin is a copolymer of fluoroolefins.

14. The aqueous dispersion composition according to claim 2, wherein the proportions, on the solid weight basis, of the repellent, organosilicon compound and fluorine-containing resin are such that the ratio (repellent+organosilicon compound)/fluorine-containing resin amounts to not less than 1 and the ratio repellent/organosilicon compound amounts to not less than 0.005 and not more than 200.

15. The aqueous dispersion composition according to claim 3, wherein the proportions, on the solid weight basis, of the repellent, organosilicon compound and fluorine-containing resin are such that the ratio (repellent+organosilicon compound)/fluorine-containing resin amounts to not less than 1 and the ratio repellent/organosilicon compound amounts to not less than 0.005 and not more than 200.

16. The aqueous dispersion composition according to claim 4, wherein the proportions, on the solid weight basis, of the repellent, organosilicon compound and fluorine-containing resin are such that the ratio (repellent+organosilicon compound)/fluorine-containing resin amounts to not less than 1 and the ratio repellent/organosilicon compound amounts to not less than 0.005 and not more than 200.

17. The aqueous dispersion composition according to claim 5, wherein the proportions, on the solid weight basis, of the repellent, organosilicon compound and fluorine-containing resin are such that the ratio (repellent+organosilicon compound)/fluorine-containing resin amounts to not less than 1 and the ratio repellent/organosilicon compound amounts to not less than 0.005 and not more than 200.

18. The aqueous dispersion composition according to claim 6, wherein the proportions, on the solid weight basis, of the repellent, organosilicon compound and fluorine-containing resin are such that the ratio (repellent+organosilicon compound)/fluorine-containing resin amounts to not less than 1 and the ratio repellent/organosilicon compound amounts to not less than 0.005 and not more than 200.

19. The aqueous dispersion composition according to claim 7, wherein the proportions, on the solid weight basis, of the repellent, organosilicon compound and fluorine-containing resin are such that the ratio (repellent+organosilicon compound)/fluorine-containing resin amounts to not less than 1 and the ratio repellent/organosilicon compound amounts to not less than 0.005 and not more than 200.

20. A coated article which is obtained by being coated with the aqueous dispersion composition according to claim 2.

21. The aqueous dispersion composition according to claim 1, wherein said repellent (1) is at least one member selected from the group consisting of perfluoroalkyl group-containing compounds, fluorinated surfactants, fluorinated oils, fluorosilicone oils and silicone oils.

* * * * *